(12) United States Patent
Chaput

(10) Patent No.: US 7,529,287 B2
(45) Date of Patent: May 5, 2009

(54) SYSTEMS AND METHODS FOR OPTICAL PUMPING USING DEPOLARIZING FILTERS

(75) Inventor: Brian Chaput, Plano, TX (US)

(73) Assignee: Sanmina-SCI Corporation, San Jose, CA (US)

( * ) Notice: Subject to any disclaimer, the term of this patent is extended or adjusted under 35 U.S.C. 154(b) by 219 days.

(21) Appl. No.: 11/038,561

(22) Filed: Jan. 18, 2005

(65) Prior Publication Data

US 2006/0159149 A1   Jul. 20, 2006

(51) Int. Cl.
H01S 3/091 (2006.01)
(52) U.S. Cl. .............................. 372/70; 372/72; 372/75
(58) Field of Classification Search .................. 372/70, 372/72
See application file for complete search history.

(56) References Cited

U.S. PATENT DOCUMENTS

| | | | |
|---|---|---|---|
| 6,433,920 B1 | 8/2002 | Welch et al. | |
| 6,433,921 B1 | 8/2002 | Wu et al. | |
| 6,512,628 B1 | 1/2003 | Terahara et al. | |
| 6,522,796 B1 | 2/2003 | Ziari et al. | |
| 6,525,869 B1 | 2/2003 | Thomas et al. | |
| 6,532,101 B2 | 3/2003 | Islam et al. | |
| 7,054,059 B1* | 5/2006 | Meli et al. | 359/334 |
| 2003/0112436 A1* | 6/2003 | Yao | 356/364 |
| 2003/0133482 A1* | 7/2003 | Yoshida et al. | 372/43 |
| 2005/0068525 A1* | 3/2005 | Taverner et al. | 356/327 |
| 2006/0001950 A1* | 1/2006 | Fujimura et al. | 359/334 |

OTHER PUBLICATIONS

Islam, M., "Raman Amplifiers for Telecommunications," IEEE Journal of Selected Topics in Quantum Electronics, May/Jun. 2002, vol. 8, No. 3, IEEE.
Plonteux, O., "DOP Testing Methods for Pump Modules in Raman Amplification," EXFO Application Note 078, Sep. 14, 2002, EXFO Electro-Optical Engineering Inc.
Burns, W., "Degree of Polarization in the Lyot Depolarizer," Journal of Lightwave Technology, Sep. 1983, vol. LT-1, No. 3, IEEE.
Chipman, Russel A., SPIE Conference on Polarization: Measurement, Analysis, and Remote Sensing II, *SPIE*, 3754:14-20, (1999).

* cited by examiner

*Primary Examiner*—Dung T Nguyen
(74) *Attorney, Agent, or Firm*—Perkins Coie LLP

(57) ABSTRACT

An optical system comprises optical pump lasers, depolarizing filters and a multiplexer. A plurality of optical pump lasers generates a plurality of initial optical signals at different wavelengths. A plurality of depolarizing filters depolarize the plurality of initial optical signals. A multiplexer multiplexes the plurality of initial optical signals to form at least one optical pump signal. These systems and methods advantageously provide at least one optical pump signal with the required energy spread across multiple polarizations with fewer optical pump lasers. The reduction of optical pump lasers may eliminate the need to balance or adjust the power and polarization of each optical pump laser. Further, by reducing the number of optical pump lasers, the rate of component failure also reduces. As a result, these systems and methods are more reliable, may reduce maintenance costs, and may reduce the size as well as weight of the optical pumping system.

18 Claims, 5 Drawing Sheets

SYSTEMS AND METHODS FOR OPTICAL PUMPING USING DEPOLARIZING FILTERS

BACKGROUND

1. Field of the Invention

The present invention relates to optical pumping using depolarizing filters, and more particularly, to systems and methods for optical pumping of a signal through depolarizing filters within an optical amplification system.

2. Description of the Prior Art

New markets and uses are constantly being developed to take advantage of the benefits of optical communications. However, to take advantage of these benefits, optical communications often require systems that inject optical pump signals into an optical fiber to amplify optical data signals. An example of such a system includes a Raman amplifier which amplifies a desired communications signal and prevents communications signal attenuation. In spite of these benefits, however, the cost of components in a Raman amplifier may be prohibitive.

FIG. 1 is an illustration of a distributed Raman amplifier in the prior art. In FIG. 1, an optical signal path 110 receives an input optical signal. Splitter 120 splits the input optical signal. The management system 130 receives and monitors the split input optical signal. Raman pump module 160 pumps an optical pump signal. The optical pump signal is at a higher energy than the input optical signal. Multiplexer/isolator 150 receives and isolates the optical pump signal. The multiplexer/isolator 150 then multiplexes the optical pump signal with the input optical signal into the optical fiber 140 to produce Stimulated Raman Scattering. The photons of the optical pump signal scatter off the vibrating atoms of the optical fiber 140 resulting in electromagnetic stimulation (i.e. Stimulated Raman Scattering) which adds energy to, and thereby amplifying, the input optical signal.

One problem with the distributed Raman amplifier 100 is that a high energy optical pump signal at a specific wavelength must be generated to produce Stimulated Raman Scattering. Optical pump lasers are often used to generate high energy optical pump signals. Optical pump signals generated by optical pump lasers are strongly polarized.

In order to increase the needed power near a specific wavelength, two polarizations orthogonally mixed are utilized. Increasing the optical pump power at a specific wavelength allows the pump signal spectrum to be more equalized as the gain profile in amplification in not uniform. The polarizations are mixed so as to not concentrate too much power at one wavelength and polarization which might cause non-linear effects in standard-type fiber deployed widely in networks today.

One solution to this problem at specific wavelengths needing increased pump power is to generate two initial optical signals at the same wavelength but with orthogonal polarizations. The two initial optical signals are then coupled and their polarizations combined to form an optical pump signal which is then multiplexed into the optical fiber 140 with the input optical signal.

FIG. 2 is an illustration of a Raman pump module 200 in the prior art. At least two pump lasers at wavelength (1) 210 generate separate initial optical signals. Each initial optical signal has a polarization, as does every other initial optical signal of a specific wavelength. The polarization beam combiner 220 couples the initial optical signals of the same wavelength and then combines their polarizations orthogonally. A wavelength division multiplexer (WDM 230) multiplexes the initial optical signals to form an optical pump signal. WDM 230 then transmits the optical pump signal band into optical fiber 240.

In this technique, multiple optical pump lasers are required for certain wavelengths to generate the desired effect of amplification which increases cost. Further, the use of multiple optical pump lasers for each wavelength requires that the power and polarization of each optical pump laser be adjusted and balanced. The process of adjustment and balance of optical pump lasers requires costly logistical support and offers an opportunity for error. Further, additional optical pump lasers increase the chances of optical system failure due to component failure.

SUMMARY OF INVENTION

The invention addresses the above problems by providing systems and methods for optical pumping of a signal within an optical amplification system. An optical system comprises optical pump lasers, depolarizing filters and a multiplexer. A plurality of optical pump lasers generates a plurality of initial optical signals at different wavelengths. A plurality of depolarizing filters depolarize the plurality of initial optical signals. A multiplexer multiplexes the plurality of initial optical signals to form at least one optical pump signal.

In some embodiments, the plurality of depolarizing filters comprises at least one Lyot depolarizer. In some embodiments, the plurality of depolarizing filters comprises at least one Wedge depolarizer.

In some embodiments, the optical system further comprises an injector device that injects at least one optical pump signal and an input optical signal into an optical fiber to produce Stimulated Raman Scattering. In some embodiments, the injector device comprises a wavelength division multiplexer. In some embodiments, the injector device comprises a dense wavelength division multiplexer. In some embodiments, the optical system further comprises an isolator that isolates the injected optical pump signal and input optical signal.

In some embodiments, the optical system further comprises a monitoring device that monitors an input optical signal to determine an input optical signal strength and a controlling device that controls the formation of at least one optical pump signal based upon the input optical signal strength. In some embodiments, the optical system further comprises a monitoring device that monitors an output optical signal to determine an output optical signal strength and a controlling device that controls the formation of at least one optical pump signal based upon the output optical signal strength. In some embodiments, the multiplexer comprises a wavelength division multiplexer.

These systems and methods advantageously provide at least one optical pump signal with the required energy spread across multiple polarizations with fewer optical pump lasers. The reduction of optical pump lasers may eliminate the need to balance or adjust the power and polarization of each optical pump laser. Further, by reducing the number of optical pump lasers, the rate of component failure also reduces. As a result, these systems and methods are more reliable and may reduce maintenance costs. These systems and methods may also reduce the size and weight of the optical pumping system. Moreover, as a result of the reduction of optical pump lasers, a significant optical component cost savings may be realized.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Optical signal amplification is a common component of many optical communications systems. In optical signal amplification, a signal is amplified so that the original signal does not attenuate to a point where communications diminish or terminate. Many optical signal amplification systems require one or more optical pump systems. It would be advantageous to reduce the number of components in an optical pump system. In reducing the number of components, component failure of the optical pump system decreases. As a result, the failure rate of the overall optical signal amplification system also decreases. The reduction of optical pump lasers may also eliminate the need to balance or adjust the power and polarization of each optical pump laser. Moreover, there may be realization of cost savings through reduction of component purchases as well as a reduction of optical system maintenance.

Figure 1:
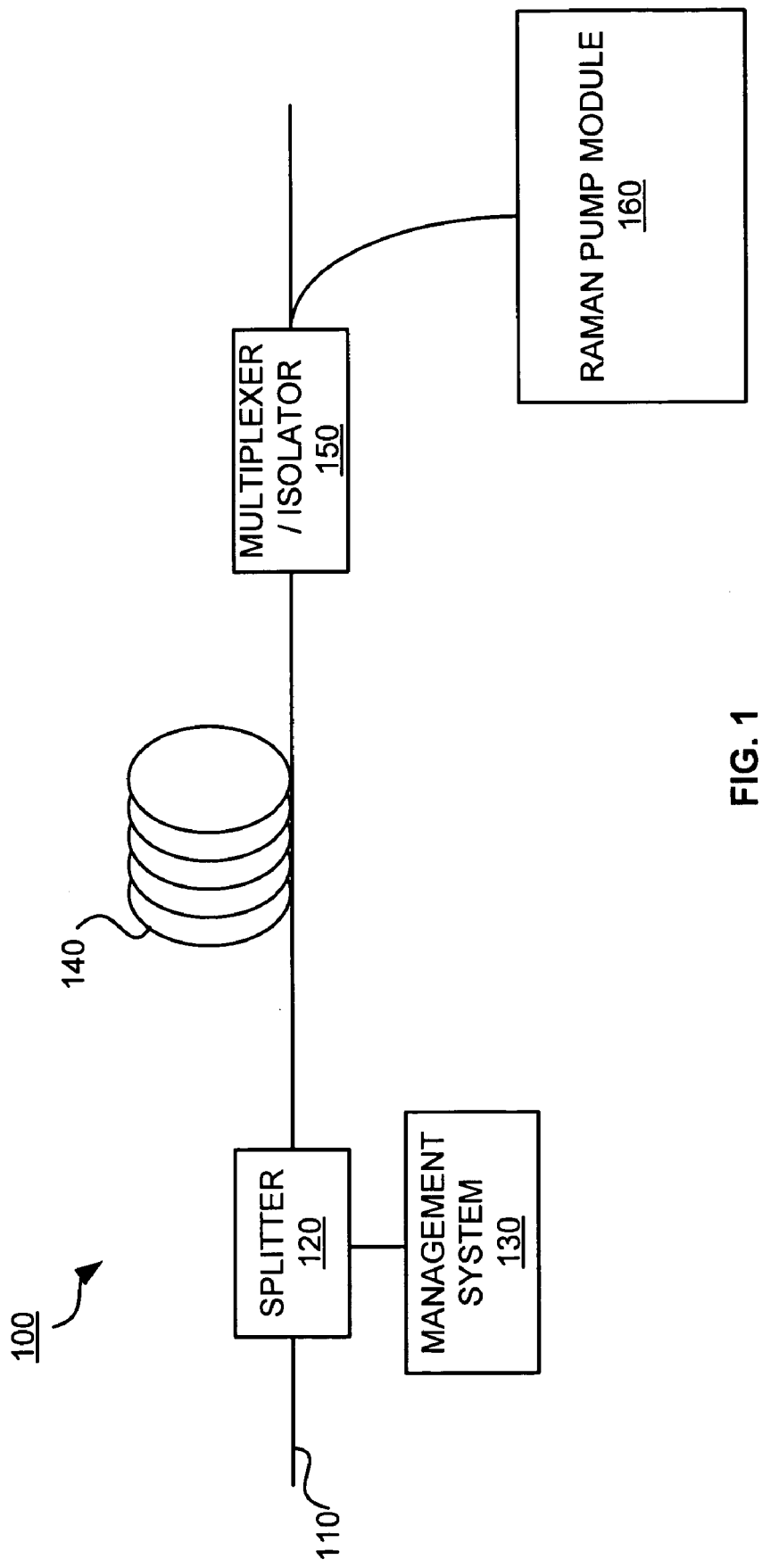
FIG. 1 is an illustration of a distributed Raman amplifier in the prior art.
Figure 2:
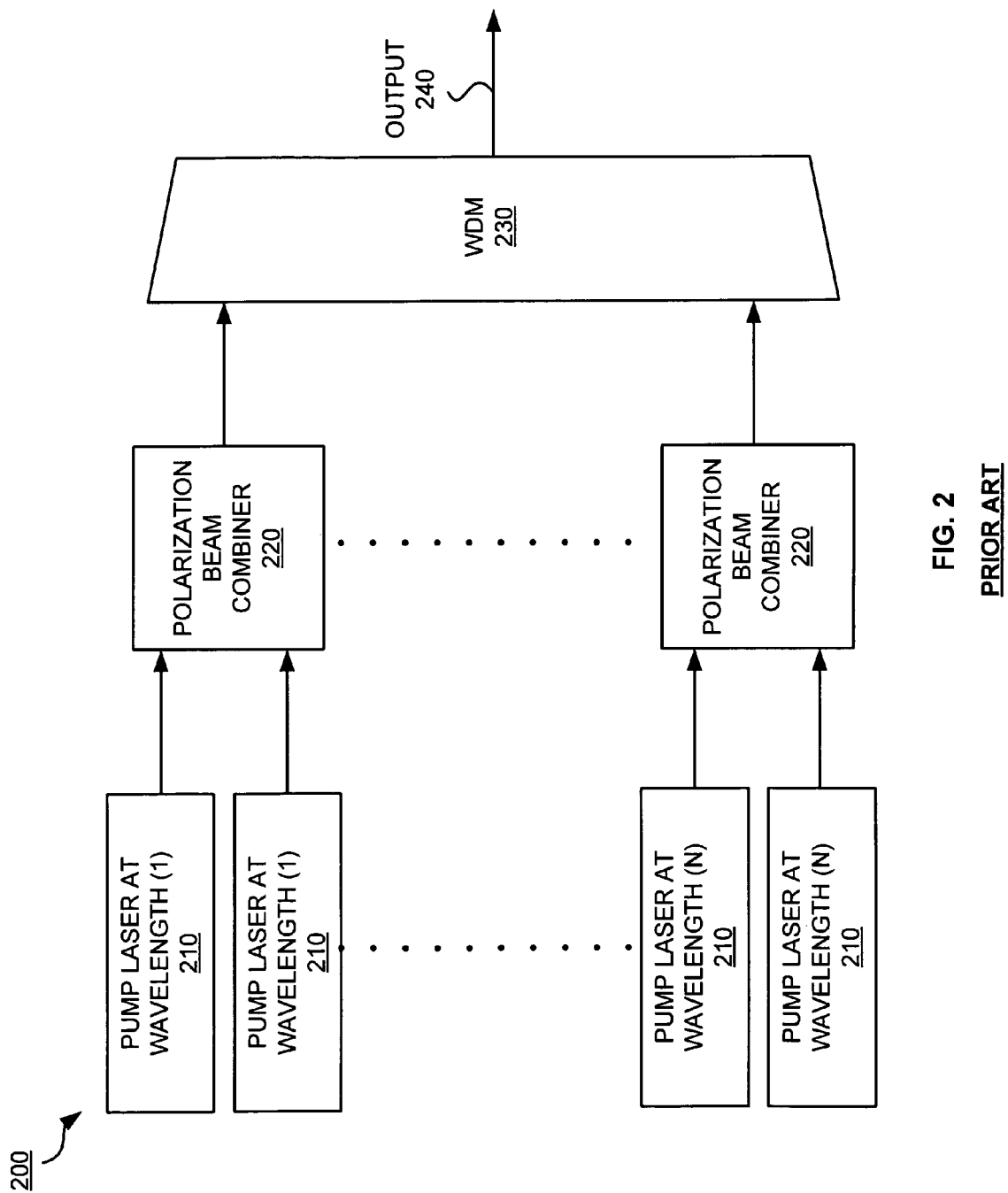
FIG. 2 is an illustration of a Raman pump module in the prior art.
Figure 3:
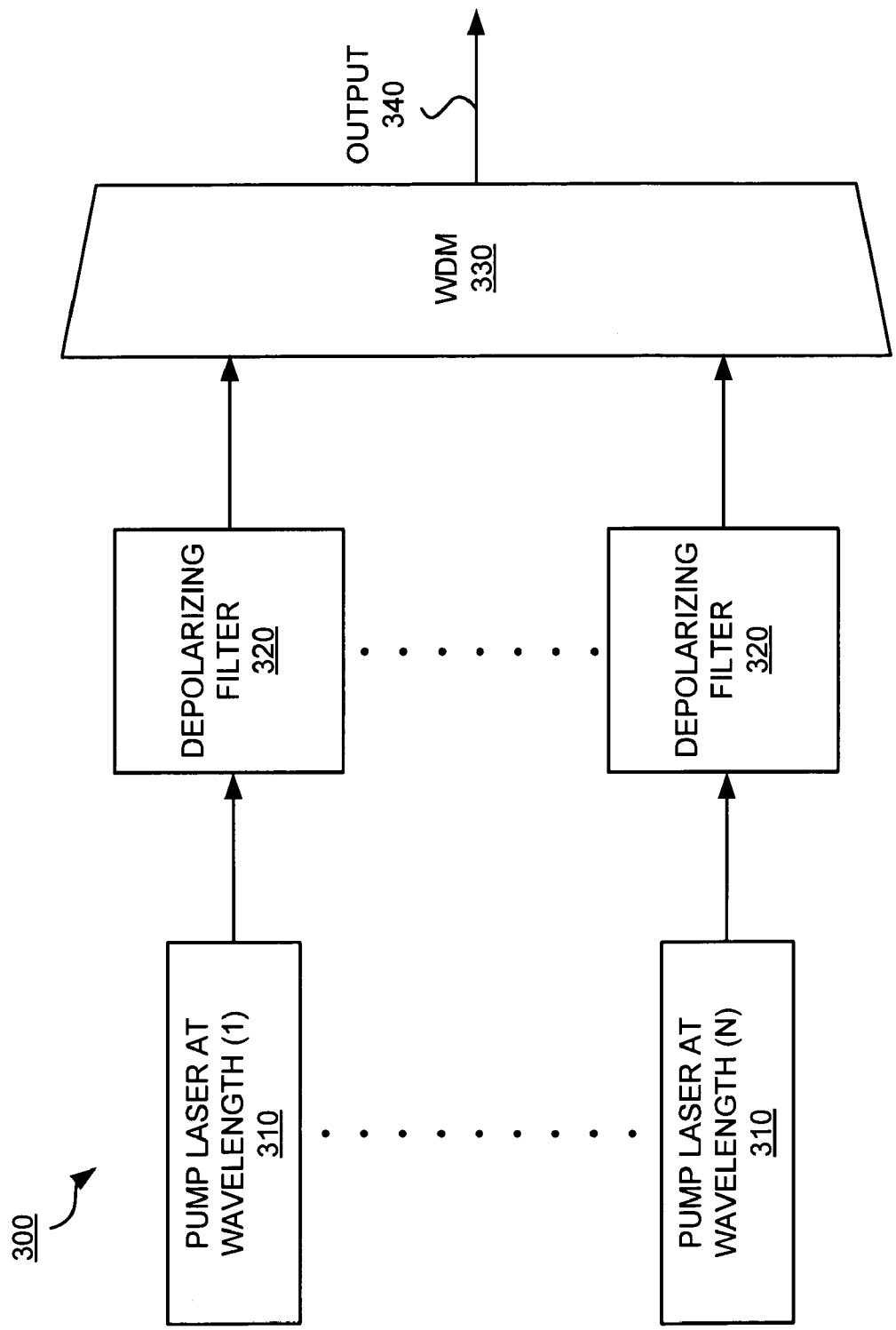
FIG. 3 is an illustration of a pump optical system in an exemplary implementation of the invention.

FIG. 3 is an illustration of a pump optical system 300 in an exemplary implementation of the invention. The pump optical system 300 includes one or more pump lasers 310, one or more depolarizing filters 320, a WDM 330, and an output link 340. In this figure, the notation denoted by pump laser at wavelength (1) and pump laser at wavelength (N) separated by periods depicts one or more arbitrarily numbered pump lasers 310 at specific wavelengths 1 to N. Similarly, the notation depicting the periods between depolarizing filters 320 indicate that there may be one or more depolarizing filter 320. In some embodiments, there may be multiple WDMs 330 coupled to one or more depolarizing filters 320. In some embodiments, not all pump signal wavelengths will require a depolarizing filter 320.

In an example depicted in FIG. 3, a single pump laser at wavelength (1) 310 generates an initial optical signal at a desired wavelength. In some embodiments, multiple pump lasers 310 generate multiple initial optical signals at different desired wavelengths.

A depolarizing filter 320 is an optical component configured to spread or lower the degree of polarization of an optical signal. As previously discussed, as a result of PDG in the amplification process, if excessive energy in a single polarization is generated, Stimulated Raman Scattering produces non-linear effects. Non-linear effects cause electromagnetic stimulation at an undesired wavelength and the desired input optical signal is not amplified. By spreading or lowering the degree of polarization of the initial optical signal with a depolarizing filter 320, the initial optical signal may be reliably pumped into a Raman amplifier.

Further, the depolarizing filter 320 eliminates the need for at least one pump laser 210. By reducing pump lasers 210, the rate of failure may be reduced. Other benefits of reducing pump lasers 210 possibly include cost and maintenance. Further, the overall optical pump system may be lighter and smaller than those that require additional pump lasers.

In some embodiments, the degree of polarization of the initial optical signal is lowered. In some embodiments, the degree of polarization of the initial optical signal is spread. In some embodiments, the depolarizing filter 320 is a Lyot depolarizer. In other embodiments, the depolarizing filter 320 is a Wedge depolarizer. In some embodiments, a single depolarizing filter 320 may receive and depolarize multiple initial optical signals. In other embodiments, multiple depolarizing filters 320 may receive and depolarize multiple initial optical signals. Those skilled in the art will recognize that multiple depolarizing filters 320 may be used to depolarize a single initial optical signal.

Once the initial optical signal is depolarized, the initial optical signal may be utilized in optical pumping systems including, but not limited to, Raman amplification, high power transmission, high power fiber laser systems, or any other application with high power pumping needs.

A WDM 330 is a wavelength division multiplexer. The WDM 330 receives and multiplexes one or more initial optical signals to form an optical pump signal. The WDM 330 then transmits the optical pump signal into output link 340. In some embodiments, output link 340 is an optical fiber. In other embodiments, the output link 340 may be a waveguide. In some embodiments, output link 340 is free space. In some embodiments, the WDM 330 may be a dense wavelength division multiplexer. In some embodiments, the output link 340 is coupled with a wavelength division multiplexer, not depicted in FIG. 3, which multiplexes one or more optical pump signals with an input optical signal. In some embodiments, the output link 340 is coupled with a dense wavelength division multiplexer which multiplexes one or more optical pump signals with an input optical signal.

The negative effects of PDG present in Raman amplification systems also effect other optical systems as well. As previously discussed, the pump optical system 300 spreads or reduces the degree of polarization of an initial optical signal by passing the initial optical signal through a depolarizing filter 320. As a result, the initial optical signal may now be utilized in optical pumping systems including, but not limited to, Raman amplification, high power transmission, high power fiber laser systems, or any other application with high power pumping needs.

Those skilled in the art will recognize that multiple pump lasers 310 may generate multiple initial optical signals of the same wavelength. Those skilled in the art will also recognize that the multiple initial optical signals of the same wavelength may be coupled either before or after depolarization. Further, those skilled in the art will recognize that the signal path through the pump optical system 300 and its individual components depicted in FIG. 3 may comprise any light traversable media, including, but not limited to, fiber, waveguide, free space, or crystal structure, including, but not limited to, sapphire. Similarly, the medium between components may not necessarily be the same medium as the medium between other components within the same system.

Figure 4:
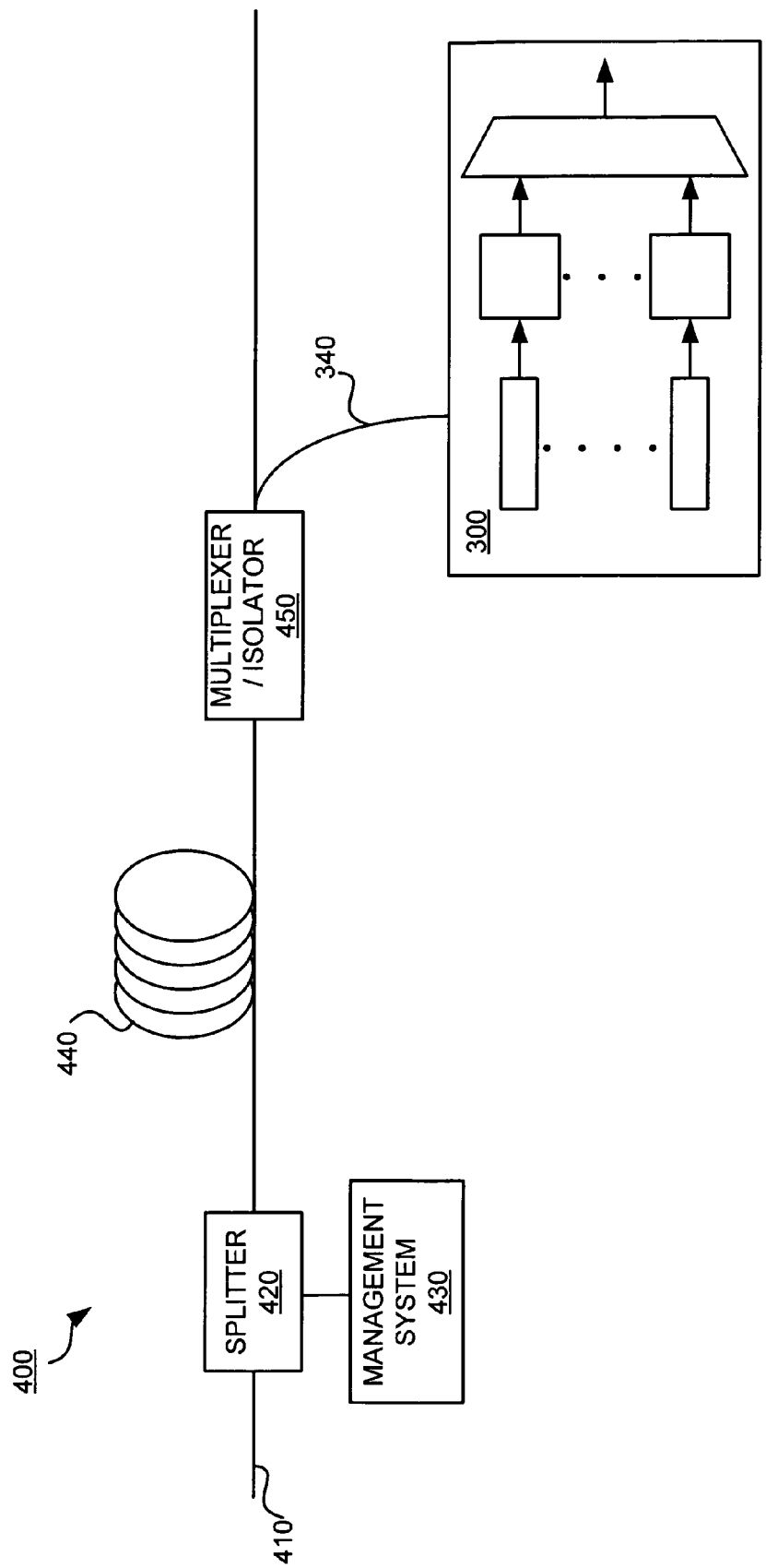
FIG. 4 is an illustration depicting a distributed Raman amplifier in an exemplary implementation of the invention.

FIG. 4 is an illustration depicting a distributed Raman amplifier 400 in an exemplary implementation of the invention. Those skilled in the art will recognize that the optical pump system 300 may be incorporated into a variety of optical systems, including, but not limited to, distributed Raman amplifiers and discrete Raman amplifiers. In FIG. 4, the distributed Raman Amplifier 400 includes an optical signal path 410, a splitter 420, a management system 430, an optical path segment 440, a multiplexer/isolator 450, output link 340, and an optical pump system 300.

In FIG. 4, an optical signal path 410 receives an input optical signal. In some embodiments, the optical signal path 410 may comprise optical fiber. In other embodiments, the optical signal path 410 may comprise a waveguide. In some embodiments, the optical signal path 410 may comprise free space. Splitter 420 then splits the input optical signal. The management system 430 receives and monitors the split input optical signal. In some embodiments, the management system 430 comprises a photo diode and a monitoring device. In this example, the photo diode receives the input optical signal and generates an electric current which is received by the monitoring device. In some embodiments, the management system 430 further comprises a controlling device configured to control the strength of one or more optical pump signals based upon the strength of the split input optical signal.

Optical pump system 300 transmits an optical pump signal. Multiplexer/isolator 450 receives and isolates the optical pump signal. The multiplexer/isolator 450 is an injector device that multiplexes the optical pump signal with the input optical signal. The multiplexer/isolator 450 injects multiplexed optical pump signal and input optical signal into the optical path segment 440 to produce Stimulated Raman Scattering. As a result, the input optical signal is amplified. In some embodiments, the multiplexer/isolator comprises a wavelength division multiplexer. In other embodiments, the multiplexer/isolator comprises a dense wavelength division multiplexer. In some embodiments, the optical path segment 440 comprises a waveguide. In other embodiments, the optical path segment 440 comprises optical fiber. In other embodiments, the optical path segment 440 comprises rare earth doped fiber. Those skilled in the art will recognized that multiple optical pump signals may be received, multiplexed, isolated, and/or injected by multiplexer/isolator 450.

Once the input optical signal is amplified, it forms an output optical signal. In some embodiments, a splitter not depicted in FIG. 4 may split the output optical signal. In this example, the management system 430 may receive and monitor the strength of the split output optical signal. In other embodiments, the management system 430 is configured to control the strength of one or more optical pump signal based upon the strength of the split output optical signal.

Those skilled in the art will recognize that the signal path through the distributed Raman amplifier 400 and its individual components depicted in FIG. 4 may comprise any light traversable media, including, but not limited to, fiber, waveguide, free space, or crystal structure, including, but not limited to, sapphire. Similarly, the medium between components may not necessarily be the same medium as the medium between other components within the same system.

Figure 5:
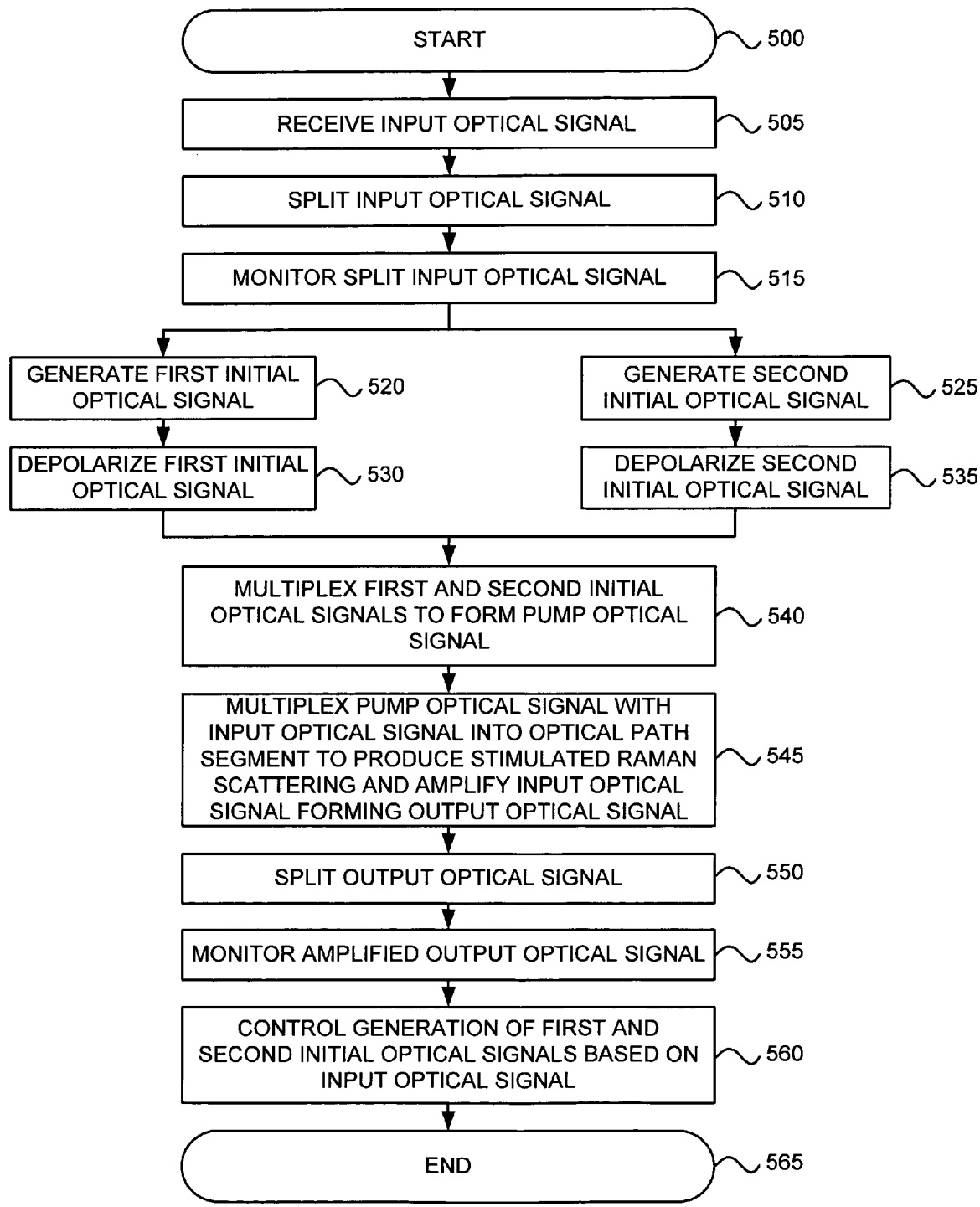
FIG. 5 is a flowchart for a distributed Raman amplifier in another exemplary implementation of the invention.

FIG. 5 is a flowchart for a distributed Raman amplifier in another exemplary implementation of the invention. FIG. 5 begins at step 500. In step 505, the optical signal path 410 receives an input optical signal which comprises two distinct wavelengths. In step 510, splitter 420 splits the input optical signal. In step 515, management system 430 monitors the split input optical signal.

In step 520, the pump laser at wavelength (1) 310 generates a first initial optical signal. Concurrently, in step 525, another pump laser at wavelength (2) 310 generates a second initial optical signal at a different wavelength from the first initial optical signal. In some embodiments, only one initial optical signal is generated. In other embodiments, a plurality of pump lasers 310 generates a plurality of initial optical signals.

In step 530, depolarizing filter 320 receives and depolarizes the first initial optical signal. Similarly, in step 535, another depolarizing filter 320 receives and depolarizes the second initial optical signal. In step 540, WDM 330 receives and multiplexes the first and second initial optical signals to form an optical pump signal. In some embodiments, the WDM 330 multiplexes the first and second initial optical signals into output link 340.

In step 545, multiplexer/isolator 450, which is an injector device, receives, isolates, and multiplexes the optical pump signal with the input optical signal into optical path segment 440 to produce Stimulated Raman Scattering and amplify the input optical signal. The amplified input optical signal forms an output optical signal. In step 550, a splitter, not depicted in FIG. 4, splits the output optical signal. In step 555, the management system 430 monitors the strength of the split output optical signal. In step 560, the management system 430 controls the strength of the optical pump signal based on the strength of the input optical signal or the output optical signal. In some embodiments, the management system 430 controls the strength of the optical pump signal based on the strength of both the input optical signal and the output optical signal. FIG. 5 ends at step 565.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An optical system comprising:
    a pump optical system configured to generate an optical pump signal, the pump optical system including:
        a plurality of optical pump lasers configured to generate a plurality of initial optical signals at different wavelengths;
        a plurality of depolarizing filters configured to depolarize the plurality of initial optical signals;
        a multiplexer configured to multiplex the plurality of initial optical signals to form the optical pump signal;
    a management system configured to convert an input optical signal to an electric current, measure the electric current to determine a strength of the input optical signal, control a strength of the optical pump signal based on the strength of the input optical signal;
    an injector device configured to multiplex the optical pump signal and the input optical signal to generate an amplified input optical signal.

2. The optical system of claim 1 wherein the depolarizing filter comprises a Lyot depolarizer.

3. The optical system of claim 1 wherein the depolarizing filter comprises a Wedge depolarizer.

4. The optical system of claim 1, wherein the injector device is configured to inject the optical pump signal and the input optical signal into an optical fiber to produce Stimulated Raman Scattering.

5. The optical system of claim 4 wherein the injector device is configured as a wavelength division multiplexing filter.

6. The optical system of claim 4, wherein the management system further comprises:
    a monitoring device configured to receive the electric current to determine the strength of the input optical signal;

and a controlling device configured to control the formation of the optical pump signal based upon the strength of the input optical signal.

7. The optical system of claim 4 further comprising an isolator configured to isolate the optical pump signal and the input optical signal.

8. The optical system of claim 1 further comprising:
a monitoring device configured to monitor an output optical signal to determine a strength of the output optical signal, wherein the output optical signal is the amplified input optical signal;
and a controlling device configured to control the formation of the optical pump signal based upon the strength of the output optical signal.

9. The optical system of claim 1 wherein the multiplexer is configured to perform wavelength division multiplexing.

10. A method for an optical system, the method comprising:
generating an optical pump signal, including:
generating a plurality of initial optical signals at different wavelengths;
depolarizing the plurality of initial optical signals by passing the plurality of initial optical signals through at least one depolarizing filter; and
multiplexing the plurality of the initial optical signals to form the optical pump signal;
converting an input optical signal to an electric current and measuring the electric current to determine a strength of the input optical signal;
controlling a strength of the optical pump signal based on the strength of the input optical signal; and
multiplexing the optical pump signal and the input optical signal to generate an amplified input optical signal.

11. The method of claim 10 wherein the depolarizing filter comprises a Lyot depolarizer.

12. The method of claim 10 wherein the depolarizing filter comprises a Wedge depolarizer.

13. The method of claim 10 further comprising injecting the optical pump signal with the input optical signal into an optical fiber to produce a Stimulated Raman Scattering to amplify the input optical signal.

14. The method of claim 13 wherein injecting the optical pump signal with the input optical signal comprises WDM filtering the optical pump signal with the input optical signal.

15. The method of claim 13 further comprising:
monitoring the input optical signal to determine the strength of the input optical signal; and controlling the formation of the optical pump signals based upon the strength of the input optical signal.

16. The method of claim 13 further comprising isolating the optical pump signal and the input optical signal.

17. The method of claim 10 further comprising:
monitoring an output optical signal to determine a strength of an output optical signal; and controlling the formation of the optical pump signal based upon the strength of the output optical signal, wherein the output optical signal is the amplified input optical signal.

18. The method of claim 10 wherein multiplexing the plurality of the initial optical signals further comprises wavelength division multiplexing filtering.

\* \* \* \* \*